United States Patent [19]
Tanaka et al.

[11] Patent Number: 5,877,098
[45] Date of Patent: Mar. 2, 1999

[54] ABRASIVE SHEET MADE OF VERY FINE AND ULTRAFINE FIBERS

[75] Inventors: Hiroshi Tanaka; Masahiro Nakajima, both of Shiga, Japan

[73] Assignee: Japan Vilene Company, Ltd, Tokyo, Japan

[21] Appl. No.: 787,684

[22] Filed: Jan. 23, 1997

[30] Foreign Application Priority Data

Jan. 24, 1996 [JP] Japan .................................. 8-029965

[51] Int. Cl.$^6$ .................................................. D04H 1/00
[52] U.S. Cl. .................. 442/341; 442/340; 442/351; 442/440; 442/408; 442/381; 442/346; 428/903
[58] Field of Search ................................ 442/340, 341, 442/351, 366, 381, 394, 400, 402, 408, 415, 346; 428/903, 932

[56] References Cited

U.S. PATENT DOCUMENTS

| | | | |
|---|---|---|---|
| 4,286,977 | 9/1981 | Klein | 55/524 |
| 5,029,319 | 7/1991 | Doi | 360/133 |
| 5,306,545 | 4/1994 | Shirayanagi et al. | 428/198 |
| 5,711,970 | 1/1998 | Lau et al. | 425/72.2 |

*Primary Examiner*—Marion McCamish
*Assistant Examiner*—Cheryl Juska
*Attorney, Agent, or Firm*—Burgess, Ryan & Wayne

[57] ABSTRACT

An abrasive sheet containing, on at least one surface thereof, a layer of a nonwoven fabric comprising not less than 80% of fibers having a fiber diameter of 10 μm or less, the nonwoven fabric being selected from a group consisting of an entangled nonwoven fabric and a melt-blown nonwoven fabrics.

21 Claims, 4 Drawing Sheets

ABRASIVE SHEET MADE OF VERY FINE AND ULTRAFINE FIBERS

BACKGROUND OF THE INVENTION

1. Field of the Invention

The present invention relates to an abrasive sheet of a nonwoven fabric. More particularly, the present invention relates to an abrasive sheet able to be used in a texturing process in the production of a magnetic recording medium.

2. Description of the Related Art

A magnetic recording medium, such as a magnetic diskette, is produced by applying a non-magnetic plating, such as an anodized aluminum or nickel-phosphorus plating, to a substrate, such as an aluminum alloy substrate to form a non-magnetically plated substrate; carrying out a texturing process on a surface of the non-magnetically plated substrate; and then sequentially coating thereon a primary layer (generally, a chromium layer or the like), a magnetic thin layer (generally, a cobalt-alloy layer or the like), and a protective layer (generally, a carbonous layer or the like). The space between the magnetic diskette and a magnetic head, i.e., a flying height, must be as small as possible. Therefore, the magnetic diskette must not have any projections from the surface thereof. Namely, the surface must be smoothed.

If the surface of the magnetic diskette is too smooth, however, the magnetic head cannot be levitated because the magnetic head adheres the diskette. To avoid this, fine grooves are formed on the surface of the non-magnetically plated substrate, i.e., a texturing process is carried out. This texturing process comprises grinding the surface of the non-magnetically plated substrate to uniformly form fine scars, i.e., a texture.

Hitherto, as an abrasive material used in the texturing process, for example, a nonwoven fabric prepared by fixing fibers having a diameter of about 3 $\mu$m with urethane resin, a woven fabric composed of fibers having a diameter of about 5 $\mu$m, or a flock-printed sheet carrying thereon a number of short fibers having a diameter of about 14 $\mu$m are known.

However, when the nonwoven fabric prepared by fixing fibers having a diameter of about 3 $\mu$m with urethane resin is used to abrade the surface of the substrate, large scratches appear on the surface of the substrate, caused by a lack of freedom of the fibers. Further, urethane resins drop off and adhere to the substrate. Accordingly, the surface of the substrate becomes nonuniform. The woven fabric composed of fibers having a diameter of about 5 $\mu$m also causes large scratches to appear on the surface of the substrate, also caused by a lack of freedom of the fibers. Further, the fibers on the flock-printed sheet are arranged perpendicular to the surface of the substrate, and thus are liable to cause large scratches to appear on the surface of the substrate.

SUMMARY OF THE INVENTION

Accordingly, the object of the present invention is to provide an abrasive sheet without the above-described defects, i.e., does not cause large scratches to appear on the surface of the substrate, can uniformly abrade the surface of the substrate, and can form a fine texture.

Other objects and advantages of the present invention will be apparent from the following description.

In accordance with the present invention, there is provided an abrasive sheet containing, on at least one surface thereof, a layer of a nonwoven fabric comprising not less than 80% of fibers having a fiber diameter of 10 $\mu$m or less, this nonwoven fabric being selected from a group consisting of an entangled nonwoven fabric and a melt-blown nonwoven fabric.

The term "fiber diameter" or "diameter" as used herein with regard to a fiber having a non-circular cross-sectional shape means a diameter of a fiber having a circular cross-sectional shape corresponding to the non-circular cross-sectional shape. The expression "not less than 80% of fibers having a fiber diameter of 10 $\mu$m or less" as used herein means that, when fiber diameters of 100 fibers randomly sampled in a nonwoven fabric layer are measured, 80 fibers or more have a diameter of 10 $\mu$m or less.

DESCRIPTION OF THE PREFERRED EMBODIMENTS

Figure 1:
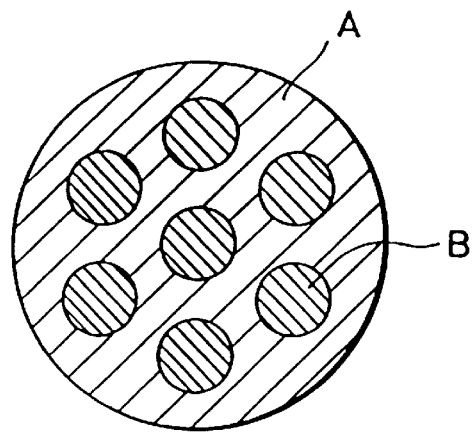
FIG. 1 is a sectional view schematically illustrating a sectional structure of one example of a dividable fiber from which fibers having a diameter of 10 $\mu$m or less and composing a nonwoven fabric layer in an abrasive sheet according to the present invention can be formed.

The present invention will be explained in detail hereinafter.

The abrasive sheet of one embodiment according to the present invention contains, on at least one surface thereof, a layer of an entangled nonwoven fabric comprising not less than 80%, preferably not less than 90%, of fibers having a fiber diameter of 10 $\mu$m or less. At least one surface of the abrasive sheet according to the present invention is an exposed nonwoven fabric layer (hereinafter sometimes referred to as an "abrasive surface") which is able to be used, for example, for a texturing process. The entangled nonwoven fabric layer forming the abrasive surface is not fixed with resin, and the shape thereof is maintained by an entangling treatment, and accordingly, there is no resin to fall off. The fibers are not firmly fixed, and have a certain flexibility. Therefore, the entangled nonwoven fabric layer does not heavily press abrasive particles against the substrate surface, and thus, does not cause large scratches to appear on the substrate surface. Further, the entangled nonwoven fabric layer forming the abrasive surface mainly comprises fibers having a diameter of 10 μm or less, and thus, provides a superior retention of fine abrasive particles. Therefore, the entangled nonwoven fabric layer can uniformly abrade the substrate surface and form a fine texture thereon.

The abrasive sheet of another embodiment according to the present invention contains, on at least one surface thereof, a layer of a melt-blown nonwoven fabric comprising not less than 80%, preferably not less than 90%, of fibers having a fiber diameter of 10 μm or less. At least one surface of the abrasive sheet according to the present invention is an exposed nonwoven fabric layer, i.e., an abrasive surface, able to be used, for example, for a texturing process. The melt-blown nonwoven fabric layer forming the abrasive surface is not fixed with resin, and the shape thereof is maintained by fusion-bonding of constitutional fibers, and accordingly, there is no resin to fall off. The fibers are not drawn and soft, and therefore, the melt-blown nonwoven fabric layer does not heavily press abrasive particles against the substrate surface, and thus does not cause large scratches to appear on the substrate surface. Further, the melt-blown nonwoven fabric layer mainly comprises fibers having a diameter of 10 μm or less, and thus, provides a superior retention of fine abrasive particles. Therefore, the melt-blown nonwoven fabric layer can uniformly abrade the substrate surface and form a fine texture thereon.

As described above, 80% or more of the constitutional fibers of at least the abrasive surface of the abrasive sheet according to the present invention are those having a fiber diameter of 10 μm or less. The fibers provide a superior retention of fine abrasive particles, and therefore, the abrasive surface can uniformly abrade the substrate surface and form a fine texture thereon. When the diameter of the fibers is more than 10 μm, the retention of fine abrasive particles is considerably lowered, and thus, the abrasive surface cannot uniformly abrade the substrate surface or form a fine texture thereon. Further, the rigidity of fibers is increased, and so the abrasive surface becomes liable to cause large scratches to appear on the substrate surface. A decrease of the fiber diameter improves the retention of the fine abrasive particles. Therefore, the fiber diameter is preferably 8 μm or less, more preferably 6 μm or less, most preferably 1 μm or less. If the fiber diameter is too small, however, the fibers are liable to be broken by friction with the substrate surface, and adhere to the surface thereof. Thus, the fiber diameter is preferably 0.01 μm or more.

Preferably, the fibers of the nonwoven fabric forming the abrasive surface of the abrasive sheet according to the present invention comprise 2 or more kinds of fibers, with respect to the fiber diameters. When the fibers of the nonwoven fabric consist of 2 kinds of fibers with respect to the fiber diameters, these fibers are preferably 0.1 to 5%, more preferably 1 to 3%, in terms of the number of fibers, of fibers with a diameter of preferably 1 to 5 μm, more preferably 2 to 3 μm, and preferably 95 to 99.9%, more preferably 97 to 99%, in terms of the number of fibers, of fibers with the diameter of preferably 0.8 μm or less, more preferably 0.5 μm or less. Hereinafter, a fiber having the diameter of preferably 1 to 5 μm, more preferably 2 to 3 μm, is sometimes referred to as a very-fine fiber, and a fiber having the diameter of preferably 0.8 μm or less, more preferably 0.5 μm or less, is sometimes referred to as an ultrafine fiber.

The fibers, particularly fine fibers such as the very-fine fibers and the ultrafine fibers, able to be used in the present invention, can be obtained from dividable fibers which can be mechanically and/or chemically divided into finer fibers, or from a melt-blowing method. As examples of the mechanical process, there may be mentioned a needle-punching, a treatment with a liquid stream such as water stream, and/or a calendering, and as examples of the chemical process, there may be mentioned the removal of resin components with a removing agent, or swelling. In the present invention, one kind of fiber can be used, but 2 or more kinds of fibers in terms of fiber diameter and/or resin components are able also to be used.

The dividable fiber able to be used to form fine fibers is, for example, a sea-islands-type fiber having a sectional construction wherein a component A able to be removed with a removing agent contains other components B which are not affected, i.e., not removed by the removing agent used for the component A, in the form of islands in the sea, as shown in FIG. 1. Fine fibers of the components B can be formed by removing the component A from the sea-islands-type fiber. When the component A is to be divided by a mechanical process, preferably, when the component A and the components B are to be separated from each other by the mechanical process, the mechanical process produces fine fibers of the component A, fine fibers of the components B, and/or a mixture thereof. The components B is to be formed from one resin, or 2 or more resins. Further, the components B is to be present in the component A as continuous or intermittent fibers in the longitudinal direction.

The removing agent is, for example, a solvent, enzyme, or microorganism, used in accordance with the resin to be removed. Preferably a solvent is used, because of the rapid removing rate and easy handling thereof. An aqueous solvent is more preferable as it is more easily handled, and the treatment therewith is also easy. The term "removable" used herein means that 95 mass % or more of a resin component is removed. The term "low-removability" means that when a certain resin is treated with a removing agent under the condition that a resin removable with the removing agent is treated with the removing agent, the mass-reduction of the former resin is 30% or less.

Figure 2:
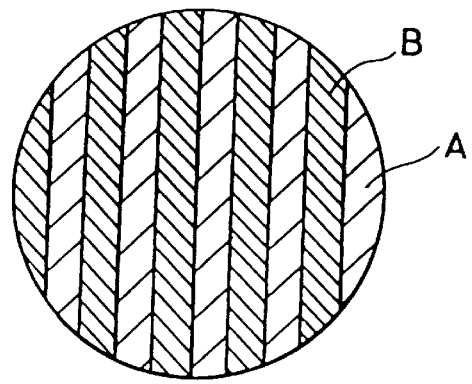
FIG. 2 is a sectional view schematically illustrating a sectional structure of another example of a dividable fiber.

Another example of the dividable fiber able to be used in the present invention is a multiple bimetal-type fiber having a sectional construction wherein a component A and a component B having a low compatibility with the component A are mutually layered, as shown in FIG. 2. Two kinds of fine fibers, i.e., fine fibers of the components A and B, can be formed by mechanically treating the multiple bimetal-type fiber. The multiple bimetal-type fiber as shown in FIG. 2 consists of 2 kinds of resin components. When a multiple bimetal-type fiber consisting of 3 or 4 kinds of resin components is used, 3 or 4 kinds of fine fibers can be formed. When multiple bimetal-type fibers comprising multiple resin components having multiple removabilities against a removing agent are combined, fine fibers may be formed by removing one or more components with the removing agent.

Figure 3:
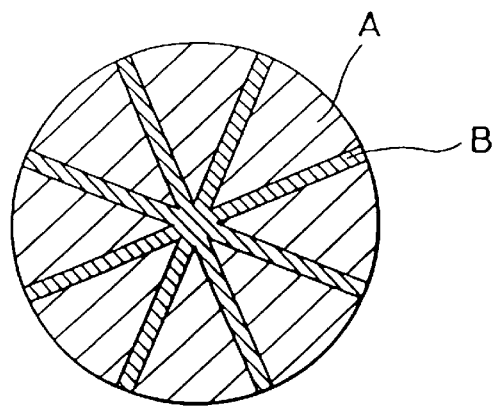
FIG. 3 is a sectional view schematically illustrating a sectional structure of still another example of a dividable fiber.
Figure 4:
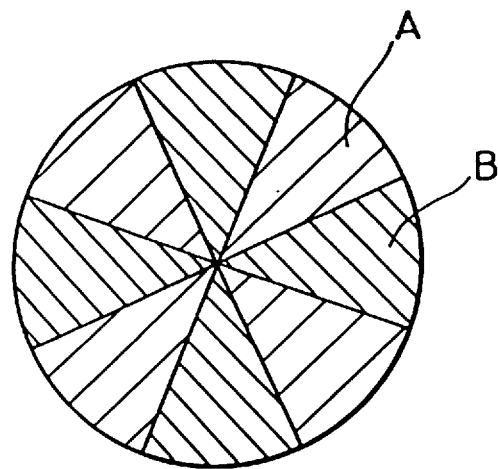
FIG. 4 is a sectional view schematically illustrating a sectional structure of still another example of a dividable fiber.

Still another example of the dividable fiber which may be used in the present invention is an orange type fiber having a sectional construction wherein a component A is divided into sections by another component B, which spreads radially from the inner portion (preferably, the fiber axis) to the fiber surface and has a low compatibility with the component A, as shown in FIGS. 3 and 4. Two kinds of fine fibers, i.e., fine fibers of the components A and B, can be formed by mechanically treating the orange type fiber. The orange type fibers as shown in FIGS. 3 and 4 consist of 2 kinds of resin components. When an orange type fiber consisting of 3 or 4 kinds of resin components is used, 3 or 4 kinds of fine fibers can be formed. When orange type fibers comprising multiple resin components having multiple removabilities against a removing agent are combined, fine fibers may be formed by removing one or more components with the removing agent.

Figure 5:
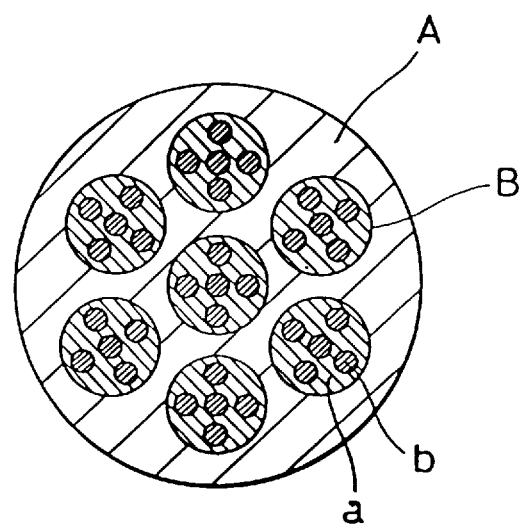
FIG. 5 is a sectional view schematically illustrating a sectional structure of still another example of a dividable fiber.
Figure 6:
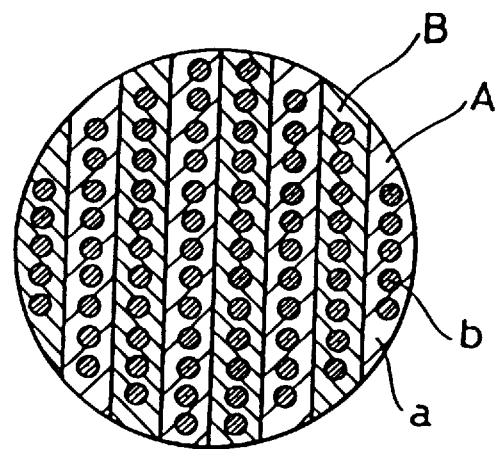
FIG. 6 is a sectional view schematically illustrating a sectional structure of still another example of a dividable fiber.
Figure 7:
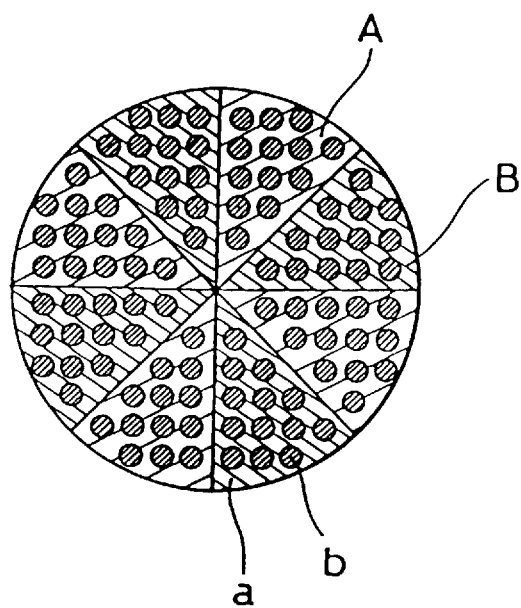
FIG. 7 is a sectional view schematically illustrating a sectional structure of still another example of a dividable fiber.

Still other examples of the dividable fiber able to be used in the present invention are a sea-islands-type fiber wherein at least one islands B is a sea-islands-type fiber consisting of a sea component a and islands components b, as shown in FIG. 5; a sea-islands-type fiber wherein at least one of the islands B is a multiple bimetal-type fiber (not shown); a sea-islands-type fiber wherein at least one of the islands B is an orange type fiber (not shown); a multiple bimetal-type fiber wherein at least one resin component (component A or B) is a sea-islands-type fiber consisting of a sea component a and islands components b, as shown in FIG. 6; a multiple bimetal-type fiber wherein at least one resin component is a multiple bimetal-type fiber or an orange type fiber (not shown); an orange type fiber wherein at least one resin component (component A or B) is a sea-islands-type fiber consisting of a sea component a and islands components b, as shown in FIG. 7; or an orange type fiber wherein at least one resin component is a multiple bimetal-type fiber or an orange type fiber (not shown). The above dividable fibers are preferably used to form fine fibers having smaller diameters.

Figure 8:
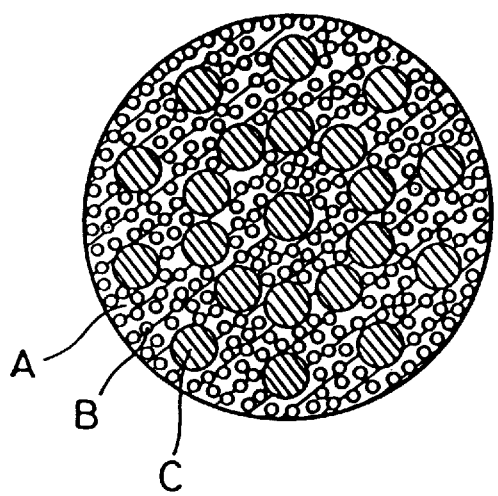
FIG. 8 is a sectional view schematically illustrating a sectional structure of still another example of a dividable fiber.

When a nonwoven fabric consisting of 2 kinds of fine fibers, i.e., very-fine fibers having a diameter of 1 to 5 $\mu$m, preferably 2 to 3 $\mu$m, and ultrafine fibers having a diameter of 0.8 $\mu$m or less, preferably 0.5 $\mu$m or less, is prepared from a dividable fiber or fibers, the very-fine fibers and the ultrafine fibers are able to be formed from 2 kinds of dividable fibers, respectively; preferably, from 1 dividable fiber, in view of the high dispersibility of fine fibers. More concretely, the dividable fiber as shown in FIG. 8 is preferably used.

The resin components of the dividable fiber may be a combination of 2 or more resins having fiber-forming properties and able to be mechanically and/or chemically divided. For example, a polyamide, such as nylon 6, nylon 66, or polyamide copolymer; a polyester, such as polyethylene terephthalate, polyethylene terephthalate copolymer, polybutylene terephthalate, or polybutylene terephthalate copolymer; a polyolefin, such as polyethylene, polypropylene, or polymethylpentene; polyurethane; polyacrylonitrile; vinyl polymer; or an aliphatic polyester polymer, such as polyglycolic acid, glycolic acid copolymer, polylactic acid, or lactic acid copolymer; an aliphatic polyester amide copolymer prepared by copolymerizing the above aliphatic polyester polymer and an aliphatic amide, such as capric amide, tetramethylene adipamide, undecanamide, dodecanoyl actamide, or hexamethylene adipamide may be used.

Polyamide is preferable as the resin component, because of a high resistance to abrasion and hydrophilic property thereof. An abrasive sheet wherein the constitutional fibers are hydrophilic is preferable for an abrading treatment. This is because, when used with an aqueous slurry containing abrasive particles, an aggregation of the abrasive particles rarely occurs, and thus, large scratches are not caused to appear on the substrate surface. Polypropylene or polyester having good strength, abrasion resistance and elasticity is also preferable.

Therefore, it is preferable to appropriately combine polyamide resin, polypropylene resin and polyester resin. For example, a combination of polyamide resin and polypropylene resin, or the combination of polyamide resin and polyester resin is preferable.

For example, when 2 kinds of fine fibers, i.e., very-fine fibers having a diameter of 1 to 5 $\mu$m, preferably 2 to 3 $\mu$m, and ultrafine fibers having a diameter of 0.8 $\mu$m or less, preferably 0.5 $\mu$m or less, are prepared, a combination of the polyamide resin having a diameter of 1 to 5 $\mu$m, preferably 2 to 3 $\mu$m, i.e., polyamide resin for the very-fine polyamide fibers, and polypropylene resin having a diameter of 0.8 $\mu$m or less, preferably 0.5 $\mu$m or less, i.e., polypropylene resin for the ultrafine polypropylene fibers is preferable. When the fine fibers are formed from one resin component, a combination of the polypropylene resin having a diameter of 1 to 5 $\mu$m, preferably 2 to 3 $\mu$m, i.e., polypropylene resin for the very-fine polypropylene fibers, and the polypropylene resin having a diameter of 0.8 $\mu$m or less, preferably 0.5 $\mu$m or less, i.e., polypropylene resin for the ultrafine polypropylene fibers is preferable.

The dividable fiber able to be used in the present invention is easily spun by a conventional conjugate spinning process, a conventional polymer blend spinning process, or a combination thereof. A flame retarder, antistatic agent, hygroscopic agent, coloring agent, dyestuff, agent can be mixed therewith to impart an electrical conductivity, and/or an agent to impart hydrophilicity, to the extent that the spinnable properties and strength of the fibers are not lowered.

The nonwoven fabric layer forming the abrasive surface of the abrasive sheet according to the present invention can contain 20% or less, preferably 10% or less, of fibers other than the above-mentioned fibers having a fiber diameter of 10 $\mu$m or less. The fibers other than the above-mentioned fibers having a fiber diameter of 10 $\mu$m or less are, for example, natural fibers such as silk, wool, cotton, or jute; a regenerated fiber such as rayon fiber; a semisynthetic fiber such as acetate fiber; a synthetic fiber such as polyamide, polyvinyl alcohol, acryl, polyester, polyvinyl chloride, polyvinylidene chloride, polyurethane, polyethylene, polypropylene or aromatic polyamide fiber. The diameter of the fibers other than the above-mentioned fibers having a fiber diameter of 10 $\mu$m or less is not particularly limited, but is preferably 15 $\mu$m or less.

The nonwoven fabric layer forming the abrasive surface of the abrasive sheet according to the present invention is an entangled nonwoven fabric or a melt-blown nonwoven fabric. The entangled nonwoven fabric can be produced, for example, by needle-punching a web or treating a web with a liquid-stream, such as a water stream. Preferable a web is entangled with a liquid stream, as this causes a uniform entangled nonwoven fabric to be produced, a substrate surface can be uniformly abraded, a fine texture can be formed, and further, a thin entangled nonwoven fabric having a low weight per unit area can be formed, and thus, when the abrasive sheet therefrom is reeled up, a longer roll length can be obtained within a usual roll diameter.

The melt-blown nonwoven fabric can be produced by a conventional melt-blowing method. The resin components for the fibers of the melt-blown nonwoven fabric are, for example, thermoplastic resins, such as polypropylene, polyamide or polyethylene terephthalate. As the resin component, polyamide is preferable because of the high resistance to abrasion and hydrophilic property thereof. Polypropylene or polyethylene terephthalate having a high strength, abrasion resistance, and elasticity is also preferable. It is possible to use an entangled-melt-blown nonwoven fabric produced by further entangling the resulting melt-blown nonwoven fabric with a needle-punching or a liquid stream treatment.

In the nonwoven fabric layer of the abrasive sheet according to the present invention, properties other than the above-mentioned fiber diameter are not particularly limited. The weight per unit area is preferably 30 to 300 g/m$^2$, more preferably 60 to 200 g/m$^2$, and the thickness is preferably 0.1 to 1.5 mm, more preferably 0.2 to 1 mm. When the weight per unit area is less than 30 g/m$^2$, the fibers in the nonwoven fabric layer may be nonuniformly dispersed. When the weight per unit area is more than 300 g/m$^2$, an amount of a slurry supplied may be increased, and an excess amount of a slurry should be used for a wet abrasion. When the thickness is less than 0.1 mm, the cushioning properties may be lowered and large scratches appear on the substrate surface. When the thickness is more than 1.5 mm, an amount of a slurry supplied may be increased, and an excess amount of a slurry should be used for a wet abrasion. Further, the roll length may be shortened.

The abrasive sheet according to the present invention carries the above-mentioned nonwoven fabric layer on at least one surface thereof, i.e., the abrasive surface. Therefore, the substrate surface can be uniformly abraded with the abrasive surface of the nonwoven fabric layer to form a fine texture. The abrasive sheet according to the present invention can carry the above-mentioned nonwoven fabric layers on both sides, or may consist only of the above-mentioned nonwoven fabric.

The abrasive sheet according to the present invention is preferably used in a method using a slurry containing abrasive particles. In this case, if an amount of water for dispersing the abrasive particles is reduced, an aggregation of the abrasive particles is liable to occur and cause large scratches to appear. Therefore, the abrasive sheet according to the present invention preferably contains, in addition to the above-mentioned nonwoven fabric layer forming the abrasive surface, a layer containing hydrophilic fibers, such as a hydrophilic layer of a nonwoven, woven or knitted fabric containing hydrophilic fibers. The term "hydrophilic fiber" used herein means a fiber having a standard moisture regain of 5% or more. The hydrophilic fiber is, for example, a rayon, polynosic, cuprammonium or acetate fiber, or tencel fiber (cellulose fiber prepared by solvent extraction). Of these fibers, a rayon or tencel fiber is preferable as it becomes soft when wetted, and does not heavily press abrasive particles against the substrate surface. A tencel fiber is more preferable because a deterioration of strength thereof when wetted is low. The hydrophilic fibers are contained preferably in an amount of 20 mass % or more in the hydrophilic layer. The hydrophilic layer is preferably located next to the nonwoven fabric layer forming the abrasive surface, so that the hydrophilic layer can supply water to the nonwoven fabric layer forming the abrasive surface.

The hydrophilic fibers can be incorporated into the nonwoven fabric layer forming the abrasive surface, to impart hydrophilic properties to the nonwoven fabric layer. In this case, it is preferable to incorporate hydrophilic fibers having a diameter of 10 μm or less.

If the dimension of the abrasive sheet according to the present invention is changed when used in a abrading process, the substrate surface cannot be uniformly abraded. Therefore, it is preferable that a reinforcing layer is contained, to thus impart a dimensional resistance to the abrasive sheet. The preferable reinforcing layer satisfies the following dimensional resistance test. When an abrasive sheet containing a reinforcing layer and having a width of 5 cm is fixed in a pair of chucks spaced 10 cm apart, and then is stretched between the chucks under load of 2 kgf, the reinforcing layer imparts a dimensional resistance to the abrasive sheet to the extent that a reduction of the width at the center of the abrasive sheet (at the center between the chucks) is 2 mm or less.

As the reinforcing layer, for example, a yarn, net, woven fabric optionally fixed with thermoplastic fibers, nonwoven fabric fixed with thermoplastic fibers, knitted fabric fixed with thermoplastic fibers or film may be used. Of these layers, a film is preferably used because it has a uniform thickness, and a high strength. When the abrasive sheet according to the present invention contains a hydrophilic layer and a reinforcing layer in addition to the above-mentioned nonwoven fabric layer, the hydrophilic layer is preferably located next to the nonwoven fabric layer, and therefore, preferably the hydrophilic layer is located on the reinforcing layer and the nonwoven fabric layer is located on the hydrophilic layer. Further, a nonwoven fabric fixed with thermoplastic fibers, or a woven fabric optionally fixed with thermoplastic fibers or a knitted fabric fixed with thermoplastic fibers which comprises hydrophilic fibers and thermoplastic fibers may be used as a hydrophilic-reinforcing layer which is a hydrophilic layer as well as a reinforcing layer.

The abrasive sheet according to the present invention may be produced, for example, by following processes:

The entangled nonwoven fabric layer comprising not less than 80% of fibers having a fiber diameter of 10 μm or less can be produced from the dividable fiber, for example, by forming a fibrous web containing the dividable fibers by a dry process, such as a card, air-laying, melt-blowing or spun-bonding process, or a wet process, and then entangling the dividable fibers with a needle-punching and/or liquid stream (particularly a water stream). When the dividable fibers able to be mechanically divided are used, the fibers are divided during the above step. The fiber length of the fibers used varies with the process for forming the web. When the web is formed by a card or air-laying process, fibers having a length of 20 to 110 mm are used. When the web is formed by a wet process, fibers having a length of 1 to 30 mm are used. The fineness of the dividable fiber is preferably 1 to 5 denier, to thus uniformly disperse the dividable fibers and easily form fibers having a fiber diameter of 10 μm or less.

The liquid-stream-entangling process suitable for forming the entangled nonwoven fabric is carried out under conditions such that, for example, nozzle plates having a nozzle diameter of 0.05 to 0.3 mm, preferably 0.08 to 0.2 mm are used while arranged in one or more lines at a pitch of 0.2 to 3 mm, preferably 0.4 to 2 mm, and a liquid-stream is injected at a pressure of 10 to 300 kg/cm$^2$, preferably 50 to 250 kg/cm$^2$. The pressure of the liquid-stream can vary, and the nozzle plate may be rocked or vibrated. When a support (such as a net or a porous plate) for conveying the fibrous web to be entangled with the liquid stream has large pores, a nonwoven fabric layer having an appearance of pores can be formed. When the pores are small, a uniform nonwoven fabric layer without an appearance of pores can be formed. If the abrasive sheet according to the present invention is used for a production of a magnetic recording medium, it is preferable to use a fine net composed of fine wires having a diameter of 0.25 mm or less and a mesh of 50 or more, or a correspondingly fine porous plate, so that the substrate surface can be more uniformly abraded and a finer texture formed.

The nonwoven fabric layer of the abrasive sheet according to the present invention must contain not less than 80% of fibers having a fiber diameter of 10 μm or less. Therefore, when the dividable fibers are divided by only a mechanical treatment, the liquid stream is preferably injected at least twice against one side or both sides of the web, to sufficiently divide the dividable fibers. It is preferable to inject the liquid stream onto a web having a low weight per unit area of about 25 to 100 g/m², to thus sufficiently divide the dividable fibers. In this case, the abrasive sheet obtained from the web having such a low weight per unit area becomes thin, and thus the fibers of the layer (such as the hydrophilic layer) next to the nonwoven fabric layer may be exposed on the surface during abrasion. Therefore, when a web having a low weight per unit area is treated with a liquid stream, it is preferable that the web having a low weight per unit area and to be an abrasive surface is treated at least once with a liquid stream, the resulting web is laminated on a fibrous web mainly comprising dividable fibers, and then the laminate is further treated with a liquid stream to sufficiently divide the web having a low weight per unit area as well as the dividable fibers in the web laminated under the former web, whereby even if the fibers in the latter web are exposed on the abrasive surface, large scratches do not appear on the substrate surface. The resulting composite nonwoven fabric layer consists of two layers, i.e., one layer comprising not less than 80% of fibers having a fiber diameter of 10 μm or less, and the other layer comprising fibers having a fiber diameter of 10 μm or less in an amount less than the former layer. Three or more fibrous webs comprising fibers having a fiber diameter of 10 μm or less may be laminated by the same procedure as mentioned above.

When the dividable fibers are chemically divided, or the division by a mechanical treatment or treatments is insufficient, it is preferable to sufficiently divide the dividable fibers by dissolving and removing the resin components with the removing agent, swelling the resin components, or calendering, after the entangling treatment.

When the dividable fibers are first mechanically treated, and then chemically treated, the fibers are entangled by the first mechanical treatment in the mechanically divided state or undivided state, and then the removable component or components are removed while the entangled state is substantially maintained. Therefore, the remaining fibers are entangled as a unit of separate bundles composed of multiple fibers. The entangled nonwoven fabric layer used in the present invention preferably comprises a nonwoven fabric wherein fibers are entangled in the form of bundles containing multiple kinds of fibers with respect to a fiber diameter. More preferably, it comprises a nonwoven fabric wherein very-fine fibers having a diameter of 1 to 5 μm, preferably 2 to 3 μm, and ultrafine fibers having a diameter of 0.8 μm or less, preferably 0.5 μm or less are contained in such bundles.

When the nonwoven fabric layer mainly comprising fibers having a fiber diameter of 10 μm or less is produced by a melt-blowing process, for example, nozzle pieces having an orifice diameter of 0.1 to 0.5 mm and arranged at a pitch of 0.6 to 1.2 mm are used, and fibers are discharged at 0.05 to 1.5 g/min per an orifice from nozzle pieces heated at 220° to 350° C. The discharged fibers are greatly fined by treating with air heated at 230° to 360° C. in an amount of 0.1 to 12 m³/min under standard conditions. The greatly fined fibers are collected on a net of about 5 to 30 mesh or a correspondingly porous plate, to form a melt-blown nonwoven fabric layer.

The hydrophilic layer containing hydrophilic fibers may be a nonwoven, woven or knitted fabric. The hydrophilic nonwoven fabric layer may be formed by entangling a web with a needle-punching or a liquid stream, fixing a web with a binder, or fusing a web with thermoplastic fibers contained as a component other than the hydrophilic fibers. A preferable process for producing the hydrophilic layer comprises laminating a fibrous web containing hydrophilic fibers on the fibrous web containing dividable fibers (i.e., a web for the abrasive surface of a nonwoven fabric layer), and entangling the fibrous web containing dividable fibers, and at the same time, the fibrous web containing hydrophilic fibers, whereby a step is carried out for integrating the nonwoven fabric layer and the hydrophilic layer. When the hydrophilic layer is formed by the above process, a liquid stream is preferably injected only to the side of the fibrous web containing dividable fibers, so that the fibers of the hydrophilic layer are not exposed on the surface of the nonwoven fabric layer of the abrasive surface. The hydrophilic layer may be integrated with the nonwoven fabric layer of the abrasive surface by plasticizing thermoplastic fibers mixed with the hydrophilic fibers, when the hydrophilic layer is also the reinforcing layer, or by bonding with other binder. When the binder is used for integrating, the layers are preferably partially adhered so that the transfer of water from the hydrophilic layer to the nonwoven fabric layer of the abrasive surface is not prevented.

The reinforcing layer in the abrasive sheet according to the present invention may be a yarn, net, nonwoven fabric fixed with thermoplastic fibers, woven fabric optionally fixed with thermoplastic fibers, knitted fabric fixed with thermoplastic fibers, or film. For example, the nonwoven fabric fixed with a thermoplastic fiber may be produced by forming a web by a dry process and/or a wet process, and passing the web through heated calender rolls to plasticize and fix the web. The reinforcing layer, the nonwoven fabric layer of the abrasive surface, and optionally, the hydrophilic layer, may be integrated by laminating a fibrous web containing dividable fibers (i.e., a web for the abrasive surface of a nonwoven fabric layer), and optionally, a fibrous web containing hydrophilic fibers (i.e., a web for the hydrophilic layer), and a layer for the reinforcing layer, and entangling the fibrous web containing dividable fibers, and at the same time, integrating it with the reinforcing layer. Further, they may be integrated with a binder or using a thermoplasticity of the layer, to become the reinforcing layer. When the reinforcing layer is a film, they may be easily integrated by laminating a melt-extruded film on the nonwoven fabric layer or the hydrophilic layer, if necessary, under a pressure.

The resulting abrasive sheet can uniformly abrade the substrate surface without causing large scratches to appear thereon, and thus form a fine texture. Therefore, the abrasive sheet is able to be preferably used in an abrading process, particularly a texturing process, for a production of a magnetic recording medium, such as a substrate for a hard diskette or the like.

EXAMPLES

The present invention will now be further illustrated by, but is by no means limited to, the following Examples.

Example 1

A laminated fibrous web was formed by laminating a parallel-laid web prepared by carding 100% of orange type dividable fibers (fineness=2 denier; fiber length=38 mm; very-fine polyester fibers having a diameter of 4.2 μm, polyamide fibers having a diameter of 6.1 μm, and very-fine polyamide fibers having a diameter of 3.1 μm, can be formed) having a sectional construction wherein the polyester component A is divided into 8 sections by the polyamide component B, which spreads radially from the fiber axis to the fiber surface as shown in FIG. 3, and a cross-laid web formed by crossing a fibrous web obtained in the same procedure as above by a cross-layer, at a mass proportion of 1:4. The laminated fibrous web was placed on a 100 mesh net composed of wires having a diameter of 0.15 mm. Both sides of the web were alternately treated twice respectively, with water injected from nozzle plates (diameter=0.15 mm; pitch=0.6 mm) under a pressure of 95 kg/cm$^2$, to divide and entangle the dividable fibers and thereby form an entangled nonwoven fabric (weight per unit area=100 g/cm$^2$; thickness=0.5 mm). The fiber diameters of 100 fibers in the nonwoven fabric were measured, and it was found that 76 fibers had a diameter of 4.2 $\mu$m, 10 fibers had a diameter of 6.1 $\mu$m, 9 fibers had a diameter of 3.1 $\mu$m, and 95% of fibers had a diameter of not more than 10 $\mu$m. The resulting nonwoven fabric was used as an abrasive sheet.

Example 2

Undrawn polyester fibers (fineness=5 denier; fiber length=38 mm) (30 mass %) and drawn polyester fibers (fineness=3 denier; fiber length=64 mm) (70 mass %) were mixed and carded to form a parallel-laid web. The resulting parallel-laid web was laminated on the entangled nonwoven fabric (on the side of the parallel-laid web) prepared by the same procedure as in Example 1. The laminate was passed through calender rolls (temperature=200° C.; linear pressure=60 kg/cm) to thereby bond the parallel-laid web, and at the same time, adhere to the entangled nonwoven fabric and integrate therewith, to thus form an abrasive sheet (weight per unit area=170 g/m$^2$; thickness=0.5 mm). The fibers in the entangled nonwoven fabric were not fused. A test tape having a width of 5 cm was prepared from the resulting abrasive sheet. When the test tape was fixed in a pair of chucks spaced 10 cm apart, and then stretched between the chucks under load of 2 kgf, the reduction of the width at the center of the abrasive sheet (at the center between the chucks) was 0 mm.

Example 3

Polyamide fibers were discharged from nozzle pieces (orifice diameter=0.3 mm; pitch=0.9 mm) heated at 300° C. at 0.2 g/min per an orifice, and greatly fined with air heated at 320° C. in an amount of 7 m$^3$/min under a standard state. The polyamide fibers were collected on a 16 mesh net to form a melt-blown nonwoven fabric (weight per unit area= 100 g/m$^2$; thickness=0.9 mm). The fiber diameters of 100 points in the melt-blown nonwoven fabric were measured, and it was found that 95% of the points had a diameter of 3–7 $\mu$m.

Thereafter, a spidery nonwoven fabric of a copolymerized polyamide resin (melting point=110° C.) was laminated on the resulting melt-blown nonwoven fabric, and then an entangled nonwoven fabric prepared by the same procedure as in Example 1 was laminated on the spidery nonwoven fabric while the parallel-laid web side was brought into contact with the spidery nonwoven fabric. The laminate was passed through roller presses (temperature=120° C.; pressure=1 kg) to fuse the spidery nonwoven fabric and form an abrasive sheet (weight per unit area= 220 g/m$^2$; thickness=1.2 mm) wherein the melt-blown nonwoven fabric and the entangled nonwoven fabric were integrated. The fibers in the entangled nonwoven fabric and the melt-blown nonwoven fabric were not fused.

Example 4

A spidery nonwoven fabric prepared by the same procedure as in Example 3 was laminated on a melt-blown nonwoven fabric prepared by the same procedure as in Example 3, and further, the abrasive sheet prepared by the same procedure as in Example 2 was laminated on the spidery nonwoven fabric while the parallel-laid web side was brought into contact with the spidery nonwoven fabric. The laminate was passed through roller presses (temperature=120° C.; pressure=1 kg) to fuse the spidery nonwoven fabric, and form an abrasive sheet (weight per unit area=290 g/m$^2$; thickness=1.3 mm) wherein the melt-blown nonwoven fabric and the abrasive sheet prepared by the same procedure as in Example 2 were integrated. The fibers in the entangled nonwoven fabric and the melt-blown nonwoven fabric were not fused. A test tape having a width of 5 cm was prepared from the resulting abrasive sheet. When the test tape was fixed in a pair of chucks spaced 10 cm apart, and then stretched between the chucks under load of 2 kgf, the reduction of the width at the center of the abrasive sheet (at the center between the chucks) was 0 mm.

Example 5

Undrawn polyester fibers (fineness=5 denier; fiber length=38 mm) (30 mass %) and rayon fibers (fineness=1.5 denier; fiber length=38 mm) (70 mass %) were mixed and carded to form a parallel-laid web. The resulting parallel-laid web was laminated on the entangled nonwoven fabric (on the side of the parallel-laid web) prepared by the same procedure as in Example 1. The laminate was passed through calender rolls (temperature=200° C.; linear pressure=60 kg/cm) to thereby bond the parallel-laid web, and at the same time, adhere to the entangled nonwoven fabric and integrate therewith and form an abrasive sheet (weight per unit area=170 g/m$^2$; thickness=0.5 mm). The fibers in the entangled nonwoven fabric were not fused. A test tape having a width of 5 cm was prepared from the resulting abrasive sheet. When the test tape was fixed in a pair of chucks spaced 10 cm apart, and then stretched between the chucks under load of 2 kgf, the reduction of the width at the center of the abrasive sheet (at the center between the chucks) was 0 mm.

Example 6

On the side of the parallel-laid web of an entangled nonwoven fabric prepared by the same procedure as in Example 1, a melt-extruded polypropylene film (thickness= 0.05 mm) was laminated, and the laminate was immediately passed through calender rolls (linear pressure=60 kg/cm) at room temperature to integrate the entangled nonwoven fabric and the film and form an abrasive sheet (weight per unit area=145 g/m$^2$; thickness=0.4 mm). A test tape having a width of 5 cm was prepared from the resulting abrasive sheet. When the test tape was fixed in a pair of chucks spaced 10 cm apart, and then stretched between the chucks under load of 2 kgf, the reduction of the width at the center of the abrasive sheet (at the center between the chucks) was 0 mm.

Example 7

A melt-blown nonwoven fabric (weight per unit area=100 g/m$^2$; thickness=0.9 mm) prepared by the same procedure as in Example 3 was placed on a 100 mesh net composed of wires having a diameter of 0.15 mm. Both sides of the fabric were alternately treated twice, respectively, with water injected from nozzle plates (diameter=0.15 mm; pitch=0.6 mm) under a pressure of 95 kg/cm$^2$ to form an entangled melt-blown nonwoven fabric (weight per unit area=100 g/cm$^2$; thickness=0.6 mm). Thereafter, a spidery nonwoven fabric of a copolymerized polyamide resin (melting point= 110° C.) was laminated on the resulting entangled melt-blown nonwoven fabric, and then an entangled nonwoven fabric prepared by the same procedure as in Example 1 was laminated on the spidery nonwoven fabric while the parallel-laid web side was brought into contact with the spidery nonwoven fabric. The laminate was passed through roller presses (temperature=120° C.; pressure=1 kg) to fuse the spidery nonwoven fabric, and form an abrasive sheet (weight per unit area=220 g/m$^2$; thickness=1.0 mm) wherein the entangled melt-blown nonwoven fabric and the entangled nonwoven fabric were integrated. The fibers in the entangled nonwoven fabric and the entangled melt-blown nonwoven fabric were not fused.

Example 8

In a conventional composite spinning apparatus for producing sea-islands type dividable fibers, nylon 6 [1013B; Ube Industries, Ltd., Japan] was extruded from nozzles for an islands component, and a pelletized mixture of 60 parts by weight of a copolymer prepared by copolymerizing terephthalic acid and ethylene glycol together with small amounts of 5-sulfoisophthalic acid and polyethylene glycol and 40 parts by weight of polypropylene (MI=3.5) was extruded from nozzles for a sea component, at a gear-pump ratio of 4.1:10, and was composite-spun at 300° C. to obtain a undrawn filament (fineness=8.2 denier). After the undrawn filament was drawn 2.7-fold at 90° C., and then crimped, the filament was cut to form sea-islands type dividable fibers (fineness=3.2 denier; fiber length=51 mm; number of crimps=0.8/mm) having a circular sectional shape. The sea-islands type dividable fibers had a sectional construction wherein 21 large islands components (C) of nylon 6 and about 1500 small islands components (B) of polypropylene were dispersed, as shown in FIG. 8. The large islands components (C) had a high compatibility with the sea component (A) and had non-circular sectional shapes.

Then, parallel-laid webs were prepared by carding 100% of the resulting sea-islands type dividable fibers, and a cross-laid web was formed by crossing parallel-laid webs by means of a cross-layer.

The cross-laid web was placed on a net (diameter of constitutional wires=0.15 mm; wire pitch=0.147 mm). Both sides of the web were alternately treated with water injected from nozzle plates (diameter=0.13 mm; pitch=0.6 mm) under pressures of 75 kg/cm$^2$, 115 kg/cm$^2$, and 115 kg/cm$^2$ while the net was conveyed at 5 m per minute to entangle the sea-islands type fibers, and dried to form an entangled nonwoven fabric (weight per unit area=127 g/m$^2$; thickness= 0.64 mm).

The entangled nonwoven fabric was dipped in 10 mass % of aqueous sodium hydroxide solution at 80° C. for 20 minutes to degradate and remove the sea component of copolymerized polyethylene terephthalate, and thereby form an abrasive sheet (weight per unit area=76 g/m$^2$; thickness= 0.36 mm) wherein bundles of very-fine nylon 6 fibers and ultrafine polypropylene fibers were entangled.

Fiber diameters of 100 fibers in the abrasive sheet were measured to find only (i.e., 100% of) very-fine nylon fibers (2% with respect to the fiber number) having a dimeter of 2.3 $\mu$m, and ultrafine polypropylene fibers (98% with respect to the fiber number) having a diameter of 0.31 $\mu$m.

Comparative Example 1

An electrostatic flock printing of polyamide piles (fiber diameter=13.7 $\mu$m; length=0.6 mm) was carried out on a plain weave fabric (weight per unit area=200 g/m) of a blending of rayon fibers and polyester fibers to form a flock-printed sheet as an abrasive sheet.

Comparative Example 2

A fibrous web was prepared from a sea-islands type dividable fibers as shown in FIG. 1, and entangled. The sea component was removed to obtain entangled web of nylon fibers (fiber diameter=2.5 to 3.5 $\mu$m). The web was fixed with about 40 g/m$^2$ of urethane resin to obtain a nonwoven fabric (weight per unit area=100 g/m$^2$; thickness=0.5 mm) [Ecsaine; Toray] as an abrasive sheet.

Comparative Example 3

A plain weave fabric (weight per unit area=200 g/m$^2$; thickness=0.3 mm) mainly comprising polyester fibers (fiber diameter=5.1 $\mu$m) [Savina; Kanebo] was used as an abrasive sheet.

Comparative Example 4

The procedure in Example 1 was repeated, except that drawn polyester fibers (fiber diameter=12.4 $\mu$m; fiber length=38 mm) were used to form a cross-laid web. The web was entangled with a water stream to form an entangled nonwoven fabric (weight per unit area=100 g/m$^2$; thickness= 0.5 mm) which was used as an abrasive sheet.

EVALUATION OF ABRASION PROPERTIES

Figure 9:
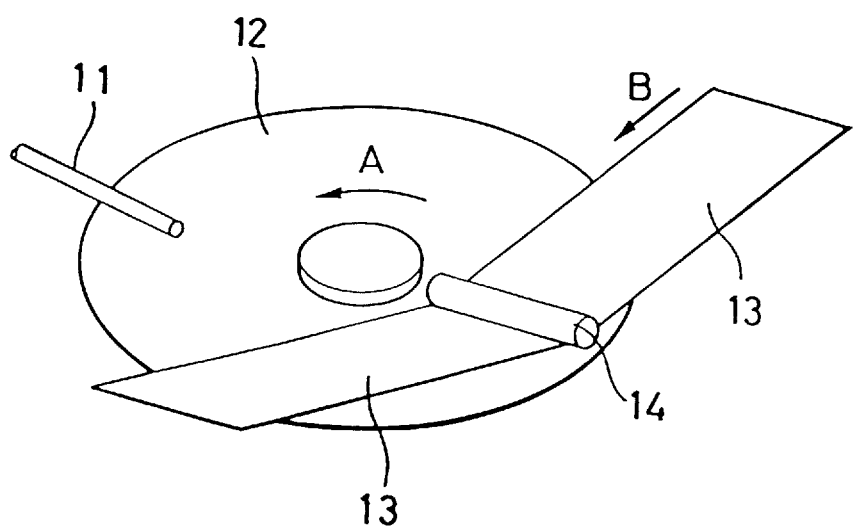
FIG. 9 illustrates a texturing process of a non-magnetically plated substrate, using an abrasive sheet according to the present invention.

Test tapes having a width of 50 mm were prepared from the abrasive sheets obtained in Examples 1 to 8 and Comparative Examples 1 to 4. As shown in FIG. 9, the tapes were used to perform a texturing process of a commercially available aluminum disk substrate 12 carrying thereon a nickel-phosphorus plating, using a diamond slurry (average particle size=0.3 $\mu$m; concentration of abrasive grain=0.4% by weight) supplied from a slurry-supplying nozzle 11. The tape 13 was pressed to the surface of the disk substrate 12, which was rotated in the direction A with a press roller 14, and conveyed in a direction B to perform a texturing process. The conditions were as follows:

number of revolutions of the disk substrate: 250 rpm number of oscillations of press roller 14: 2000/min.

pressure of tape to the disk substrate: 2.0 kg/cm$^2$ feed rate of tape: 5 mm/sec.

abrading time: 50 sec.

amount of slurry supplied: 10 ml/min.

The conditions after the texturing process were as shown in Table 1.

TABLE 1

| | Abrasive surface | Ra (angstrom) | Rv (angstrom) |
| --- | --- | --- | --- |
| Example 1 | cross-laid web | 16 | 62 |
| Example 2 | cross-laid web | 16 | 65 |
| Example 3 | melt-blown nonwoven fabric | 12 | 38 |
| Example 4 | melt-blown nonwoven fabric | 12 | 36 |
| Example 5 | cross-laid web | 16 | 60 |
| Example 6 | cross-laid web | 16 | 66 |
| Example 7 | melt-blown nonwoven fabric | 12 | 36 |
| Example 8 | cross-laid web | 9 | 55 |
| Comparative Example 1 | flock-printed piles | 24 | 120 |

TABLE 1-continued

| | Abrasive surface | Ra (angstrom) | Rv (angstrom) |
|---|---|---|---|
| Comparative Example 2 | nonwoven fabric | 20 | 95 |
| Comparative Example 3 | plain weave fabric | 18 | 82 |
| Comparative Example 4 | cross-laid web | 20 | 98 |

Ra and Rv were measured by an apparatus for measuring a surface roughness/ultrafine shape (Tencor P-12; Tencor).
Ra: average surface roughness. A smaller value is good.
Rv: maximum depth of depression (from an average of depressions and projections on substrate surface). A larger value means a generation of deep (large) scratches.

As described above, the abrasive sheet of one embodiment according to the present invention contains, on at least one surface thereof, a layer of an entangled nonwoven fabric comprising not less than 80% of fibers having a fiber diameter of 10 μm or less. The entangled nonwoven fabric layer is not fixed with resin, and the its shape is maintained by an entangling treatment, and thus no resin falls off. The fibers are not firmly fixed, and have a good flexibility. Therefore, the entangled nonwoven fabric layer does not heavily press abrasive particles against the substrate surface, and thus does not cause large scratches to appear on the substrate surface. Further, the entangled nonwoven fabric layer mainly comprises fibers having a diameter of 10 μm or less, and thus has a superior retention of fine abrasive particles. Therefore, the entangled nonwoven fabric layer can uniformly abrade the substrate surface and form a fine texture thereon.

The abrasive sheet of another embodiment according to the present invention contains, on at least one surface thereof, a layer of a melt-blown nonwoven fabric comprising not less than 80% of fibers having a fiber diameter of 10 μm or less. The melt-blown nonwoven fabric layer is not fixed with resin, and the shape thereof is maintained by a fusion-bonding of constitutional fibers, and thus no resin falls off. The fibers are not drawn and soft. Therefore, the melt-blown nonwoven fabric layer does not heavily press abrasive particles against the substrate surface, and thus does not cause large scratches to appear on the substrate surface. Further, the melt-blown nonwoven fabric layer mainly comprises fibers having a diameter of 10 μm or less, and thus has a superior retention of fine abrasive particles. Therefore, the melt-blown nonwoven fabric layer can uniformly abrade the substrate surface and form a fine texture thereon.

Although the present invention has been described with reference to specific embodiments, various changes and modifications obvious to those skilled in the art are deemed to be within the spirit, scope, and concept of the invention.

What we claim is:

1. An abrasive sheet containing, on at least one surface thereof, a layer of an entangled nonwoven fabric comprising not less than 80% of resinous divided fibers having a fiber diameter of 10 μm or less, wherein said fibers comprise very fine resinous divided fibers having a fiber diameter of 1 to 5 μm and ultrafine resinous divided fibers having a fiber diameter of 0.8 μm or less.

2. The abrasive sheet according to claim 1, wherein the diameter of said very fine resinous divided fibers is 2 to 3 μm, and the diameter of said ultrafine resinous divided fibers is 0.5 μm or less.

3. The abrasive sheet according to claim 1, wherein said very fine resinous divided fibers account for 0.1 to 5% of the total number of fibers, and said ultrafine resinous divided fibers account for 95 to 99.9% of the total number of fibers.

4. The abrasive sheet according to claim 2, wherein said very fine resinous divided fibers account for 0.1 to 5% of the total number of fibers, and said ultrafine resinous divided fibers account for 95 to 99.9% of the total number of fibers.

5. The abrasive sheet according to claim 3, wherein said very fine resinous divided fibers account for 1 to 3% of the total number of fibers, and said ultrafine resinous divided fibers account for 97 to 99% of the total number of fibers.

6. The abrasive sheet according to claim 4, wherein said very fine resinous divided fibers account for 1 to 3% of the total number of fibers, and said ultrafine resinous divided fibers account for 97 to 99% of the total number of fibers.

7. The abrasive sheet according to claim 1, wherein said very fine resinous divided fibers are polyamide or polypropylene fibers, and said ultrafine resinous divided fibers are polypropylene fibers.

8. The abrasive sheet according to claim 2, wherein said very fine resinous divided fibers are polyamide or polypropylene fibers, and said ultrafine resinous divided fibers are polypropylene fibers.

9. The abrasive sheet according to claim 1, wherein said very fine resinous divided fibers and said ultrafine synthetic drawn fibers are entangled in the form of bundles.

10. The abrasive sheet according to claim 1, further containing a layer of hydrophilic fibers.

11. The abrasive sheet according to claim 1, further containing a hydrophilic reinforcing layer.

12. The abrasive sheet according to claim 1, consisting of said entangled nonwoven fabric layer.

13. An abrasive sheet containing, on at least one surface thereof, a layer of a nonwoven fabric comprising not less than 80% of resinous fibers having a fiber diameter of 10 μm or less, said nonwoven fabric being selected from a group consisting of an entangled nonwoven fabric and a melt-blown nonwoven fabric, wherein said fibers comprise very fine resinous fibers having a fiber diameter of 2 to 3 μm and ultrafine resinous fibers having a fiber diameter of 0.5 μm or less.

14. The abrasive sheet according to claim 13, wherein said very fine resinous fibers account for 0.1 to 5% of the total number of fibers, and said ultrafine resinous fibers account for 95 to 99.9% of the total number of fibers.

15. The abrasive sheet according to claim 14, wherein said very fine resinous fibers account for 1 to 3% of the total number of fibers, and said ultrafine resinous fibers account for 97 to 99% of the total number of fibers.

16. The abrasive sheet according to claim 13, wherein said very fine resinous fibers are polyamide or polypropylene fibers, and said ultrafine resinous fibers are polypropylene fibers.

17. The abrasive sheet according to claim 14, wherein said very fine resinous fibers are polyamide or polypropylene fibers, and said ultrafine resinous fibers are polypropylene fibers.

18. The abrasive sheet according to claim 13, wherein said very fine resinous fibers and said ultrafine resinous fibers are entangled in the form of bundles.

19. The abrasive sheet according to claim 13, further containing a layer of hydrophilic fibers.

20. The abrasive sheet according to claim 13, further containing a hydrophilic reinforcing layer.

21. The abrasive sheet according to claim 13, consisting of said nonwoven fabric layer.

* * * * *

UNITED STATES PATENT AND TRADEMARK OFFICE
CERTIFICATE OF CORRECTION

PATENT NO. : 5,877,098
DATED : March 2, 1999
INVENTOR(S) : Hiroshi TANAKA and Masahiro NAKAJIMA It is certified that error appears in the above-identified patent and that said Letters Patent is hereby corrected as shown below:

Column 16, lines 24-25; "synthetic drawn" should read
--resinous divided--

Signed and Sealed this

Twenty-eighth Day of September, 1999

Attest:

Q. TODD DICKINSON

*Attesting Officer*      *Acting Commissioner of Patents and Trademarks*